United States Patent
Kaneshima et al.

(10) Patent No.: US 10,919,012 B2
(45) Date of Patent: Feb. 16, 2021

(54) CRUDE OIL DISPERSION STABILIZER

(71) Applicant: KURARAY CO., LTD., Kurashiki (JP)

(72) Inventors: Takuma Kaneshima, Kurashiki (JP); Yosuke Kumaki, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 148 days.

(21) Appl. No.: 15/758,596

(22) PCT Filed: Sep. 14, 2016

(86) PCT No.: PCT/JP2016/077055
§ 371 (c)(1),
(2) Date: Mar. 8, 2018

(87) PCT Pub. No.: WO2017/047616
PCT Pub. Date: Mar. 23, 2017

(65) Prior Publication Data
US 2018/0243706 A1    Aug. 30, 2018

(30) Foreign Application Priority Data

Sep. 15, 2015 (JP) ................................. 2015-181952

(51) Int. Cl.
| | |
|---|---|
| *B01F 17/00* | (2006.01) |
| *C09K 8/588* | (2006.01) |
| *C09K 8/035* | (2006.01) |
| *C08L 91/00* | (2006.01) |
| *C08F 216/06* | (2006.01) |
| *C08F 16/06* | (2006.01) |
| *C08L 29/04* | (2006.01) |

(52) U.S. Cl.
CPC .......... *B01F 17/0028* (2013.01); *C08F 16/06* (2013.01); *C08F 216/06* (2013.01); *C08L 91/00* (2013.01); *C09K 8/035* (2013.01); *C09K 8/588* (2013.01); *C08F 2500/02* (2013.01); *C08L 29/04* (2013.01); *C08L 2201/56* (2013.01); *C10G 2300/308* (2013.01); *C10G 2300/80* (2013.01)

(58) Field of Classification Search
CPC .... B01F 17/0028; C08F 16/06; C08F 216/06; C08L 91/00
See application file for complete search history.

(56) References Cited

U.S. PATENT DOCUMENTS

| | | | | |
|---|---|---|---|---|
| 4,405,375 A | * | 9/1983 | Gibson ................ | C08L 95/005 106/277 |
| 5,414,029 A | * | 5/1995 | Lemoine ............... | C08L 95/005 524/59 |
| 5,977,273 A | * | 11/1999 | Saeki ..................... | C08F 14/06 526/202 |
| 6,451,885 B1 | | 9/2002 | Dresin et al. | |
| 2008/0112984 A1 | * | 5/2008 | Schulte ................. | A61K 8/042 424/400 |
| 2010/0184917 A1 | * | 7/2010 | Kato ....................... | C08F 2/18 525/56 |
| 2010/0294497 A1 | * | 11/2010 | Crabtree ............... | C09K 8/588 166/305.1 |
| 2012/0267113 A1 | * | 10/2012 | Fletcher ................ | C09K 8/588 166/310 |
| 2015/0315479 A1 | | 11/2015 | Aljubori et al. | |

FOREIGN PATENT DOCUMENTS

| | | | |
|---|---|---|---|
| CN | 1094062 A | | 10/1994 |
| CN | 1900219 A | | 1/2007 |
| CN | 102876306 A | | 1/2013 |
| JP | 59-56494 A | | 3/1984 |
| JP | H09241466 A | * | 9/1997 |
| JP | 2000-86498 A | | 3/2000 |
| JP | 2002-520468 A | | 7/2002 |
| JP | 2010-168701 A | | 8/2010 |
| WO | WO 2005/040669 A1 | | 5/2005 |
| WO | WO 2011/023990 A1 | | 3/2011 |
| WO | WO 2014/096813 A1 | | 6/2014 |
| WO | WO 2016/163496 A1 | | 10/2016 |

OTHER PUBLICATIONS

L. Kotzeva & R. Mateva, "Alcoholysis of Copolymers of Vinyl Acetate with Itaconic Acid," 39 J. App. Polymer Science 1419 (1990).*

English-language machine translation of JPH09241466, conducted on Espacenet on Jun. 10, 2020.*

International Search Report dated Nov. 1, 2016 in PCT/JP2016/077055 filed Sep. 14, 2016.

* cited by examiner

*Primary Examiner* — Nicholas E Hill
(74) *Attorney, Agent, or Firm* — Oblon, McClelland, Maier & Neustadt, L.L.P.

(57) ABSTRACT

Provided is a crude oil dispersion stabilizer containing a vinyl alcohol-based polymer, wherein a degree of saponification of the vinyl alcohol-based polymer is greater than 70 mol % and 82 mol % or less, and the total content of carboxyl groups and lactone rings is 0.02 to 1 mol % relative to all structural units of the vinyl alcohol-based polymer. According to this, there is provided a crude oil dispersion stabilizer capable of dispersing or emulsifying a highly viscous crude oil, thereby reducing the viscosity and allowing the resulting crude oil dispersion liquid or emulsion to be present stably for a long time.

4 Claims, No Drawings

CRUDE OIL DISPERSION STABILIZER

TECHNICAL FIELD

The present invention relates to a crude oil dispersion stabilizer containing a vinyl alcohol-based polymer.

BACKGROUND ART

Crude oil typified by heavy oil is unconventional oil which is higher in viscosity than conventional oil and is expected to contribute to relieve the problem of exhaustion of petroleum because of its rich reserve. However, since heavy oil is high in viscosity and poor in fluidity, there is a problem that its efficient recovery from an oil layer and its pipeline transportation are difficult.

As a method to improve the fluidity of such heavy oil and recover and transport it, there is disclosed a technology to reduce the viscosity by emulsifying a heavy oil in an aqueous solution using a polyvinyl alcohol (PVA) as a dispersing and emulsifying agent (Patent Document 1, 2). Patent Document 1 and Patent Document 2 each teach that the methods disclosed therein can effectively emulsify heavy oils having an API specific gravity of 30° or less as well as extra heavy oils and bitumens which are extremely high in viscosity and have an API specific gravity of 10° or less, thereby successfully reducing their viscosity. In addition, Patent Document 3 discloses that a fuel composition prepared by adding a polyvinyl alcohol having a specific degree of saponification and a specific absorbance to a mixture containing a solvent and a liquid hydrocarbon such as heavy oil can be stored for a long time even at low temperatures and has a moderate fluidity. However, according to the investigation carried out by the present inventors, emulsions or fuel compositions obtained by those methods are problematic in that a phenomenon that the viscosity increases in a short time, or precipitates are formed, or particles aggregate and become large, or an oil separates is often observed, and they are poor in stability.

PRIOR ART DOCUMENTS

Patent Documents

Patent document 1: WO 2005/040669 A1
Patent document 2: WO 2011/023990 A1
Patent document 3: JP 59-56494 A

SUMMARY OF THE INVENTION

Problems to be Solved by the Invention

The present invention was devised in order to solve the above-described problems and aims to provide a crude oil dispersion stabilizer capable of dispersing or emulsifying a highly viscous crude oil to reduce its viscosity and allowing the resulting crude oil dispersion liquid or emulsion to be present stably for a long time.

Means for Solving the Problems

The present inventors studied earnestly in order to attain the above-mentioned object, and as a result, have accomplished the present invention by finding that a highly viscous crude oil can be emulsified and the state of the emulsion can be allowed to be present stably for a long time by use of a crude oil dispersion stabilizer containing a vinyl alcohol-based polymer having a degree of saponification greater than 70 mol % and 82 mol % or less, and wherein the total content of carboxyl groups and lactone rings is 0.02 to 1 mol % relative to all structural units of the vinyl alcohol-based polymer.

The above-mentioned problems can be solved by providing a crude oil dispersion stabilizer containing a vinyl alcohol-based polymer, wherein a degree of saponification of the vinyl alcohol-based polymer is greater than 70 mol % and 82 mol % or less, and the total content of carboxyl groups and lactone rings is 0.02 to 1 mol % relative to all structural units of the vinyl alcohol-based polymer.

It is preferred that a viscosity-average degree of polymerization of the vinyl alcohol-based polymer is 100 to 4000, and it is preferred that the crude oil dispersion stabilizer is used for a crude oil having an API specific gravity of 30° or less.

The above-mentioned problem can be solved by providing a crude oil treatment agent containing the above-mentioned crude oil dispersion stabilizer and water, wherein the crude oil treatment agent contains 0.05 to 40 parts by mass of the crude oil dispersion stabilizer relative to 100 parts by mass of the entire amount of the crude oil treatment agent.

Moreover, the above-mentioned problems can be solved by providing a crude oil dispersion liquid containing the above-mentioned crude oil treatment agent and a crude oil, wherein the crude oil dispersion liquid contains 3 to 50 parts by mass of the crude oil treatment agent, 0.001 to 1 part by mass of the vinyl alcohol-based polymer, and 50 to 97 parts by mass of the crude oil, relative to 100 parts by mass of the entire amount of the crude oil dispersion liquid.

Effects of the Invention

By use of the crude oil dispersion stabilizer of the present invention, it is possible to disperse or emulsify a highly viscous crude oil and thereby reduce the viscosity thereof, and to allow the resulting crude oil dispersion liquid or emulsion to be present stably for a long time.

BEST MODE FOR CARRYING OUT THE INVENTION

The crude oil dispersion stabilizer of the present invention is characterized by containing a vinyl alcohol-based polymer having a degree of saponification greater than 70 mol % and 82 mol % or less, wherein the total content of carboxyl groups and lactone rings is 0.02 to 1 mol % relative to all structural units of the vinyl alcohol-based polymer. It has been revealed that by use of the crude oil dispersion stabilizer of the present invention, a crude oil dispersion liquid or emulsion with a low viscosity can be afforded by dispersing or emulsifying a highly viscous crude oil. The crude oil dispersion liquid or emulsion thus obtained does not increase in viscosity in a short time and is excellent in stability. As shown by the result of the comparison of examples with comparative examples disclosed below, the dispersion stability of a crude oil decreased in comparative examples in which the degree of saponification and the total content of carboxyl groups and lactone rings were out of the above ranges, whereas the dispersion stability of a crude oil was excellent in Examples 1 to 8 containing a vinyl alcohol-based polymer having a degree of saponification greater than 70 mol % and 82 mol % or less, and wherein the total content of carboxyl groups and lactone rings is 0.02 to 1 mol % relative to all structural units of the vinyl alcohol-based polymer. Thus, it becomes possible to efficiently recover a crude oil from an oil layer. Moreover, it also becomes possible to transport through a pipeline.

The crude oil as used in the present invention includes heavy oil, bitumen (oil sand), tar and pitch. It is possible to disperse or emulsify a highly viscous crude oil with the crude oil dispersion stabilizer of the present invention. It is preferred that the crude oil be a crude oil having an API specific gravity of 30° or less. That is, a crude oil dispersion stabilizer to be used for a crude oil having an API specific gravity of 30° or less is a preferred embodiment of the present invention.

The vinyl alcohol-based polymer used in the present invention is characterized in that the degree of saponification thereof is greater than 70 mol % and 82 mol % or less. This makes it possible to obtain a crude oil dispersion stabilizer of the present invention excellent in crude oil dispersion stability. When the degree of saponification is 70 mol % or less, there is a possibility that the viscosity of a resulting crude oil dispersion liquid will increase in a short time or a resulting crude oil dispersion liquid will separate in a short time. The degree of saponification is preferably 71 mol % or more, and more preferably 72 mol % or more. On the other hand, when the degree of saponification is greater than 82 mol %, there is a possibility that it will become difficult to disperse a crude oil and there is also a possibility that the crude oil dispersion liquid will separate in a short time. Preferably, the degree of saponification is 81 mol % or less. The degree of saponification can be measured in accordance with JIS K6726 (1994).

The viscosity-average degree of polymerization (hereinafter sometimes referred to simply as degree of polymerization) of the vinyl alcohol-based polymer used in the present invention is not particularly limited and is preferably 100 to 4000. From the viewpoint of improvement in dispersion stability, the viscosity-average degree of polymerization is preferably 150 or more, and more preferably 200 or more. On the other hand, when the viscosity-average degree of polymerization is greater than 4000, there is a possibility that the productivity of a vinyl alcohol-based polymer will decrease. The viscosity-average degree of polymerization is more preferably 3500 or less, even more preferably 3000 or less, and particularly preferably 2500 or less. The viscosity-average degree of polymerization of a vinyl alcohol-based polymer is a value measured in accordance with JIS K6726 (1994). Specifically, a vinyl alcohol-based polymer is re-saponified to a degree of saponification of 99.5 mol % or more and purified, and then the viscosity-average degree of polymerization thereof can be calculated using the following formula from the intrinsic viscosity $[\eta]$ (l/g) thereof measured in water at 30° C.

$$P=([\eta]\times 10000/8.29)^{(1/0.62)}$$

The vinyl alcohol-based polymer used in the present invention is characterized in that the total content of carboxyl groups and lactone rings is 0.02 to 1 mol % relative to all structural units of the vinyl alcohol-based polymer. This makes it possible to obtain a crude oil dispersion stabilizer of the present invention excellent in crude oil dispersion stability. When the total content is less than 0.02 mol %, there is a possibility that it will become difficult to disperse a crude oil and there is also a possibility that the crude oil dispersion liquid will separate in a short time. The total content is preferably 0.03 mol % or more, and more preferably 0.04 mol % or more. On the other hand, when the total content is more than 1 mol %, there is a possibility that the crude oil dispersion liquid will separate in a short time. The total content is preferably 0.8 mol % or less, more preferably 0.6 mol % or less, and even more preferably 0.4 mol % or less.

The method for producing the vinyl alcohol-based polymer used in the present invention is not particularly limited, and examples thereof include: (1) a method of saponifying a vinyl ester-based polymer obtained by copolymerizing a vinyl ester-based monomer with a monomer having a capability of generating a carboxyl group and a lactone ring; (2) a method in which a vinyl ester-based monomer is polymerized in the presence of a thiol compound having a carboxyl group such as mercaptoacetic acid and 3-mercaptopropionic acid and then the product is saponified; (3) a method in which in polymerization of a vinyl ester-based monomer, a chain transfer reaction to alkyl groups of the vinyl ester-based monomer and a vinyl ester-based polymer is taken place to obtain a highly branched vinyl ester-based polymer, which is then saponified; (4) a method in which a copolymer of a monomer having an epoxy group with a vinyl ester-based monomer is reacted with a thiol compound having a carboxyl group, followed by saponification; and (5) a method using an acetalization reaction of a vinyl alcohol-based polymer with an aldehyde having a carboxyl group (see JP 2000-309607 A, etc.). Especially, the production method of (1) above is preferably adopted from the viewpoint of being able to easily adjust the amount of carboxyl groups and lactone rings to be introduced.

Examples of the vinyl ester-based monomer include vinyl acetate, vinyl formate, vinyl propionate, vinyl caprylate, and vinyl versatate; of these, vinyl acetate is preferred from an industrial point of view.

Examples of the above-mentioned monomer having a capability of generating a carboxyl group and a lactone ring include unsaturated dicarboxylic acids such as itaconic acid, maleic acid and fumaric acid, and salts, anhydrides or esters thereof; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide derivatives such as acrylamide, N-methylacrylamide, N-ethylacrylamide, N,N-dimethylacrylamide, diacetone acrylamide, acrylamidopropanesulfonic acid and salts thereof, acrylamidopropyldimethylamine and salts or quaternary salts thereof, N-methylolacrylamide and derivatives thereof; and methacrylamide derivatives such as methacrylamide, N-methylmethacrylamide, N-ethylmethacrylamide, methacrylamidopropanesulfonic acid and salts thereof, methacrylamidopropyldimethylamine and salts or quaternary salts thereof, N-methylolmethacrylamide and derivatives thereof. Especially, an unsaturated dicarboxylic acid, such as itaconic acid, maleic acid and fumaric acid, and a salt, an anhydride or an ester thereof are preferably used.

In the polymerization of a vinyl ester-based monomer, the vinyl ester-based monomer may be copolymerized with an additional monomer other than the above-mentioned monomer having a capability of generating a carboxyl group and a lactone ring as long as not affecting the spirit of the present invention. Examples of the additional monomers that can be used include alpha-olefins such as ethylene, propylene, n-butene, isobutylene and 1-hexene; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; vinylsilyl compounds such as vinyltrimethoxysilane; oxyalkylene group-containing monomers such as polyoxyethylene (meth)acrylate, polyoxypropylene (meth)acrylate, polyoxyethylene (meth)acrylamide, polyoxypropylene (meth)acrylamide, polyoxyethylene (1-(meth)acrylamide-1,1-dimethylpropyl) ester, polyoxyethylene (meth)allyl ether, polyoxypropylene (meth)allyl ether, polyoxyethylene vinyl ether and polyoxypropylene vinyl ether; and isopropenyl acetate.

The total content of carboxyl groups and lactone rings of the above-mentioned vinyl alcohol-based polymer can be determined, for example, from peaks of proton NMR. A vinyl alcohol-based polymer for analysis is prepared by fully saponifying a vinyl alcohol-based polymer to a degree of saponification of 99.95 mol % or more, then fully performing methanol washing, and subsequently drying under reduced pressure at 90° C. for two days. In the case of (1) above, a vinyl alcohol-based polymer prepared for analysis is dissolved in DMSO-$D_6$ and then measurement is performed at 60° C. using proton NMR. The content is calculated by a conventional method using a peak (2.0 ppm) derived from a main chain methine for monomers of acrylic acid, acrylic esters, acrylamide, and acrylamide derivatives, or using a peak (0.6 to 1.1 ppm) derived from a methyl group attached directly to a main chain for monomers of methacrylic acid, methacrylic esters, methacrylamide, and methacrylamide derivatives. The content of the monomer having a carboxyl group derived from fumaric acid, maleic acid, itaconic acid, maleic anhydride, itaconic anhydride or the like is measured by dissolving the vinyl alcohol-based polymer prepared for analysis in DMSO-$D_6$, then adding several drops of trifluoroacetic acid, and then performing measurement at 60° C. using proton NMR. In the quantitative determination, the content is calculated by a conventional method using a methine peak of a lactone ring attributed to 4.6 to 5.2 ppm. In the cases of (2) and (4), the content was calculated using the peak (2.8 ppm) derived from methylene attached to a sulfur atom. In the case of (3), the vinyl alcohol-based polymer prepared for analysis is dissolved in methanol-$D_4$/$D_2O$=2/8 and then measurement is performed at 80° C. using proton NMR. The peaks derived from methylene of a terminal carboxyl group or an alkali metal salt thereof are attributed to 2.2 ppm (integral value A) and 2.3 ppm (integral value B), the peak derived from methylene of a terminal lactone ring is attributed to 2.6 ppm (integral value C), and the peak derived from methine of a vinyl alcohol unit is attributed to 3.5 to 4.15 ppm (integral value D), and then the content of carboxyl groups and lactone rings is calculated by the formula given below. Herein, A represents the amount of modification (mol %) and specifically represents the content of an additional monomer other than monomers having a capability to generate a carboxyl group and a lactone ring described above when copolymerizing the vinyl ester-based monomer with the additional monomer.

$$\text{Content of carboxyl groups and lactone rings (mol \%)} = 50 \times (A+B+C) \times (100-A)/(100 \times D)$$

In the case of (5) above, the vinyl alcohol-based polymer prepared for analysis is dissolved in DMSO-$D_6$ and then measurement is performed at 60° C. using proton NMR. The content is calculated by a conventional method using peaks at 4.8 to 5.2 ppm derived from methine of an acetal moiety.

In the present invention, a vinyl alcohol-based polymer with a large content of 1,2-glycol linkages produced by polymerizing a vinyl ester-based monomer under a temperature condition higher than usual can also be used. In this case, the content of 1,2-glycol linkages is preferably 1.9 mol % or more, more preferably 2.0 mol % or more, and even more preferably 2.1 mol % or more.

As the saponification reaction of the vinyl ester-based polymer, there can be applied an alcoholysis or hydrolysis reaction using a conventionally known basic catalyst such as sodium hydroxide, potassium hydroxide, and sodium methoxide, or an acidic catalyst such as p-toluenesulfonic acid. Examples of the solvent to be used for the saponification reaction include alcohols such as methanol and ethanol; esters such as methyl acetate and ethyl acetate; ketones such as acetone and methyl ethyl ketone; and aromatic hydrocarbons such as benzene and toluene; these may be used singly or two or more of them may be used in combination. In particular, it is convenient and therefore preferable to perform the saponification reaction in the presence of sodium hydroxide, which is a basic catalyst, using methanol or a mixed solution of methanol with methyl acetate as a solvent.

The crude oil dispersion stabilizer of the present invention may be added directly to a crude oil, but it is preferably used as a crude oil treatment agent prepared by mixing it with water. In this embodiment, it is preferred that the crude oil dispersion stabilizer be contained 0.05 to 40 parts by mass relative to 100 parts by mass of the entire amount of the crude oil treatment agent. From the viewpoint of further improving the dispersion stability of a crude oil, the lower limit of the amount of the crude oil dispersion stabilizer is more preferably 0.1 parts by mass or more. The upper limit of the amount of the crude oil dispersion stabilizer is more preferably 30 parts by mass or less, and even more preferably 20 parts by mass or less. In the present invention, a crude oil treatment agent containing 0.05 to 40 parts by mass of the crude oil dispersion stabilizer and 60 to 99.95 parts by mass of water, relative to 100 parts by mass of the entire amount of the crude oil treatment agent is a preferred embodiment. From the viewpoint of further improving the dispersion stability of a crude oil, a crude oil treatment agent containing 0.1 to 30 parts by mass of the crude oil dispersion stabilizer and 70 to 99.9 parts by mass of water is a more preferred embodiment, and a crude oil treatment agent containing 0.1 to 20 parts by mass of the crude oil dispersion stabilizer and 80 to 99.9 parts by mass of water is an even more preferred embodiment.

The above-mentioned crude oil treatment agent is preferably an aqueous solution containing the crude oil dispersion stabilizer. As long as the effect of the present invention is not disturbed, a solvent other than water, such as an alcohol, may be contained in the above-mentioned crude oil treatment agent, and a stabilizer, a surfactant, and the like, which are usually used may also be contained.

In the present invention, the method of dispersing or emulsifying a crude oil using the crude oil treatment agent is not particularly limited. A method of mixing the above-mentioned crude oil treatment agent and a crude oil as a pretreatment for pipeline transportation is a preferred embodiment, and a method of pouring the above-mentioned crude oil treatment agent into an oil layer, thereby obtaining a dispersed or emulsified crude oil dispersion liquid is also a preferred embodiment. A method of modifying a crude oil using the crude oil treatment agent is also a preferred embodiment.

In the present invention, the blending ratio in dispersing or emulsifying a crude oil using the crude oil treatment agent is not particularly limited, and the mass ratio (crude oil treatment agent/crude oil) of the crude oil treatment agent to the crude oil is preferably 3/97 to 50/50. From the viewpoint of further improving the dispersion stability of the crude oil, the above-mentioned mass ratio is more preferably 5/95 to 40/60.

Moreover, preferred embodiments of the present invention include a crude oil dispersion liquid containing the above-mentioned crude oil treatment agent, wherein the crude oil dispersion liquid contains 3 to 50 parts by mass of the crude oil treatment agent, 0.001 to 1 part by mass of the vinyl alcohol-based polymer, and 50 to 97 parts by mass of the crude oil, relative to 100 parts by mass of the entire amount of the crude oil dispersion liquid. From the viewpoint of further improving the dispersion stability of the crude oil, the content of the crude oil treatment agent is preferably 5 to 40 parts by mass and the content of the crude oil is preferably 60 to 95 parts by mass, relative to 100 parts by mass of the entire amount of the crude oil dispersion liquid. From the viewpoint of further improving the dispersion stability of the crude oil, the content of the vinyl alcohol-based polymer is preferably 0.05 to 0.8 parts by mass. The thus-obtained crude oil dispersion liquid is suitably used as an energy source.

EXAMPLES

The present invention is described more concretely with reference to examples and comparative examples, but the invention is not limited to the examples. In the following examples and comparative examples, "part" and "%" are on mass basis unless otherwise stated.

[Synthesis of PVA]

<PVA-1>

(1) To a reactor equipped with a stirrer, a reflux condenser, an argon introduction tube, a comonomer supply port, and a supply port for a polymerization initiator were charged 4500 parts by mass of vinyl acetate, 0.18 parts by mass of itaconic acid (IA) as a comonomer, and 7036 parts by mass of methanol, and the inside of the system were flushed with argon for 30 minutes while bubbling argon. Aside from this, a methanol solution of itaconic acid (concentration: 5% by mass) was prepared as a successive addition solution (hereinafter referred to as delay solution) of a comonomer, and argon was bubbled for 30 minutes. Warming of the reactor was started, 5 parts by mass of 2,2'-azobisisobutyronitrile (AIBN) was added and polymerization was thereby initiated at the time when the internal temperature reached 60° C. During the progress of the polymerization reaction, the monomer composition (the molar ratio of vinyl acetate to itaconic acid) in the polymerization solution was kept constant by dropping the prepared delay solution in the system. After continuing the polymerization at 60° C. for 4.7 hours, the polymerization was terminated by cooling. The polymerization ratio at termination of the polymerization was 60%. Then, the unreacted monomer was removed at 30° C. under a reduced pressure while sometimes adding methanol, and thus a methanol solution of a polyvinyl acetate (concentration: 55.6%) into which itaconic acid had been introduced was obtained.

(2) To 540 parts by mass of the methanol solution of a polyvinyl acetate into which itaconic acid had been introduced, obtained in the above (1), were added 201 parts by mass of methanol and 3.75 parts by mass of ion-exchanged water (the solution contained 300 parts by mass of the polyvinyl acetate into which itaconic acid had been introduced), and then a methanol solution of sodium hydroxide (concentration: 12.8%) was further added and saponification was performed at 40° C. (in the saponification solution, the concentration of the polyvinyl acetate into which itaconic acid had been introduced was 40%, the water content was 0.5% by mass, and the molar ratio of sodium hydroxide to the vinyl acetate units in the polyvinyl acetate into which itaconic acid had been introduced was 0.005). Because a gellated material was formed about 25 minutes after the addition of the methanol solution of sodium hydroxide, the gellated material was pulverized with a pulverizer, and then the saponification was allowed to further progress by leaving the system at rest at 40° C. for 35 minutes. Methyl acetate was added thereto for neutralizing the remaining alkali, and then Soxhlet washing was performed for 16 hours using methanol, followed by drying at 40° C. for 12 hours in a vacuum dryer, and thus itaconic acid-modified PVA (PVA-1) was obtained. Table 1 shows: the polymerization conditions; the saponification conditions; the total content of carboxyl groups and lactone rings determined by $^1$H-NMR; the content of vinyl alcohol units (the degree of saponification) and the viscosity-average degree of polymerization, measured in accordance with JIS K6726 (1994).

<PVA-2 to PVA-9>

PVA-2 to PVA-9 were prepared in the same manner as for PVA-1 except that polymerization conditions (the charged amounts of vinyl acetate, methanol, AIBN, and itaconic acid) and saponification conditions (the concentration of polyvinyl acetate and the molar ratio of sodium hydroxide to vinyl acetate units) were changed as shown in Table 1. Table 1 shows: the polymerization conditions; the saponification conditions; the total content of carboxyl groups and lactone rings determined by $^1$H-NMR; the content of vinyl alcohol units (the degree of saponification) and the viscosity-average degree of polymerization, measured in accordance with JIS K6726 (1994).

Example 1

To a glass screw tube were added 6 parts by mass of a 0.5% by mass aqueous solution of PVA-1 and 14 parts by mass of a heavy oil (viscosity at 35° C.: 580 mPa·s, API specific gravity: 11.6), which were then stirred at 1500 rpm for 15 minutes using a magnetic stirrer, and thus a crude oil dispersion liquid was prepared. The viscosity (A) of the crude oil dispersion liquid just after the preparation and the viscosity (B) of the crude oil dispersion liquid after a lapse of 6 hours at 35° C. were measured at 35° C. using a B-type viscosity meter. The results obtained are shown in Table 2. As an index of dispersion liquid stability, the value of (B/A) is shown in Table 2.

Examples 2 to 8

Crude oil dispersion liquids were prepared and evaluated in the same manner as Example 1 except that the type of PVA, the concentration of PVA, the type of crude oil, and the dispersion liquid composition were changed as shown in Table 2. The bitumen used in Examples 7 and 8 is a product produced in Canada (viscosity at 35° C.: 66100 mPa·s, API specific gravity: 7.6). The results obtained are shown in Table 2.

Comparative Example 1

A crude oil dispersion liquid was prepared and evaluated in the same manner as Example 1 except for using PVA-6 instead of PVA-1 used in Example 1. The results obtained are shown in Table 2.

Comparative Example 2

A crude oil dispersion liquid was prepared and evaluated in the same manner as Comparative Example 1 except for using bitumen instead of the heavy oil used in Comparative Example 1. Precipitates were immediately formed in the resulting crude oil dispersion liquid, and therefore the viscosity could not be measured. The results obtained are shown in Table 2.

Comparative Examples 3 to 5

Crude oil dispersion liquids were prepared and evaluated in the same manner as Example 1 except that the type of PVA was changed as shown in Table 2. The results obtained are shown in Table 2.

As seen from the above results, the viscosity of a crude oil dispersion liquid increased after a lapse of 6 hours in Comparative Example 1 (heavy oil) in which the degree of saponification was over the upper limit, and likewise, precipitates were formed in a crude oil dispersion liquid and the viscosity could not be measured in Comparative Example 2 (bitumen). In Comparative Example 3 (heavy oil) in which the total content of carboxyl groups and lactone rings was less than the lower limit, Comparative Example 4 (heavy oil) in which the total content of carboxyl groups and lactone rings exceeded the upper limit, and Comparative Example 5 (heavy oil) in which the degree of saponification was lower than the lower limit, the viscosities of the crude oil dispersion liquids increased after a lapse of 6 hours. In contrast, the dispersion stability of a crude oil was excellent in Examples 1 to 8 containing a vinyl alcohol-based polymer having a degree of saponification greater than 70 mol % and 82 mol % or less, and wherein the total content of carboxyl groups and lactone rings is 0.02 to 1 mol % relative to all structural units of the vinyl alcohol-based polymer. Thus, it is shown to be possible to efficiently recover a crude oil from an oil layer. Moreover, it is also shown to be possible to transport through a pipeline.

TABLE 1

| | Components used for polymerization | | | | | Properties of PVA | | | |
|---|---|---|---|---|---|---|---|---|---|
| | Vinyl acetate (parts by mass) | Methanol (parts by mass) | AIBN (parts by mass) | IA (parts by mass) | Polymerization ratio (%) | Saponification | | Degree of polymerization | Degree of saponification (mol %) | Carboxylic acid + lactone ring (mol %) |
| | | | | | | NaOH molar ratio | Water content (%) | | | |
| PVA-1 | 4500 | 7036 | 5 | 0.18 | 60 | 0.005 | 0.5 | 500 | 80 | 0.071 |
| PVA-2 | 4500 | 4193 | 3.5 | 0.095 | 55 | 0.004 | 0.5 | 800 | 72 | 0.037 |
| PVA-3 | 4500 | 852 | 1 | 0.059 | 40 | 0.005 | 0.5 | 2400 | 80 | 0.023 |
| PVA-4 | 4500 | 3288 | 2.5 | 0.12 | 50 | 0.0045 | 0.5 | 1000 | 75 | 0.046 |
| PVA-5 | 4500 | 1454 | 2 | 0.67 | 50 | 0.0062 | 0.5 | 1700 | 74 | 0.258 |
| PVA-6 | 4500 | 7076 | 5 | 0.23 | 60 | 0.007 | 0.5 | 500 | 88 | 0.089 |
| PVA-7 | 4500 | 233 | 1 | 0.041 | 40 | 0.004 | 0.5 | 3500 | 72 | 0.016 |
| PVA-8 | 4500 | 3129 | 2 | 3.1 | 50 | 0.016 | 0.5 | 1000 | 73 | 1.264 |
| PVA-9 | 4500 | 7036 | 5 | 0.18 | 60 | 0.003 | 0.5 | 500 | 70 | 0.061 |

AIBN: 2,2'-azobisisobutyronitrile
IA: itaconic acid
Polymerization ratio: polymerization ratio of the vinyl acetate used
NaOH molar ratio: molar ratio of sodium hydroxide to vinyl acetate units in polyvinyl acetate

TABLE 2

| | Crude oil treatment agent | | Composition of crude oil dispersion liquid | | Viscosity of crude oil dispersion liquid mPa·s | | |
|---|---|---|---|---|---|---|---|
| | PVA | Concentration % by mass | Type of crude oil | Crude oil treatment agent % by mass | Crude oil % by mass | Just after preparation (A) | After a lapse of 6 hours (B) | (B/A) |
| Example 1 | PVA-1 | 0.5 | Heavy oil | 30 | 70 | 122 | 156 | 1.28 |
| Example 2 | PVA-1 | 0.3 | Heavy oil | 30 | 70 | 131 | 169 | 1.29 |
| Example 3 | PVA-2 | 0.5 | Heavy oil | 25 | 75 | 147 | 187 | 1.27 |
| Example 4 | PVA-3 | 0.5 | Heavy oil | 30 | 70 | 167 | 217 | 1.30 |
| Example 5 | PVA-4 | 0.5 | Heavy oil | 30 | 70 | 151 | 187 | 1.24 |
| Example 6 | PVA-5 | 0.5 | Heavy oil | 30 | 70 | 164 | 215 | 1.31 |
| Example 7 | PVA-1 | 0.5 | Bitumen | 25 | 75 | 265 | 389 | 1.47 |
| Example 8 | PVA-2 | 0.5 | Bitumen | 30 | 70 | 288 | 419 | 1.45 |
| Comparative Example 1 | PVA-6 | 0.5 | Heavy oil | 30 | 70 | 113 | 287* | 2.54 |
| Comparative Example 2 | PVA-6 | 0.5 | Bitumen | 30 | 70 | Unmeasurable | — | — |
| Comparative Example 3 | PVA-7 | 0.5 | Heavy oil | 30 | 70 | 177 | 378* | 2.14 |
| Comparative Example 4 | PVA-8 | 0.5 | Heavy oil | 30 | 70 | 162 | 390* | 2.41 |
| Comparative Example 5 | PVA-9 | 0.5 | Heavy oil | 30 | 70 | 134 | 302* | 2.25 |

*The value is a reference value because separation was partially observed.

The invention claimed is:

1. A crude oil dispersion liquid, comprising:
a crude oil treatment agent and a crude oil,
wherein the crude oil treatment agent comprises a crude oil dispersion stabilizer and water, and comprises 0.05 to 40 parts by mass of the crude oil dispersion stabilizer relative to 100 parts by mass of an entire amount of the crude oil treatment agent, wherein the crude oil dispersion stabilizer comprises a vinyl alcohol-based polymer, wherein a degree of saponification of the vinyl alcohol-based polymer is greater than 70 mol % and 82 mol % or less, and a total content of carboxyl groups and lactone rings is 0.02 to 1 mol % relative to all structural units of the vinyl alcohol-based polymer, and
the crude oil dispersion liquid comprises 3 to 50 parts by mass of the crude oil treatment agent, 0.001 to 1 part by mass of the vinyl alcohol-based polymer, and 50 to 97 parts by mass of the crude oil, relative to 100 parts by mass of an entire amount of the crude oil dispersion liquid.

2. The crude oil dispersion liquid according to claim 1, wherein a viscosity-average degree of polymerization of the vinyl alcohol-based polymer is 100 to 4000.

3. A method for treating a crude oil, the method comprising:
treating the crude oil with a crude oil dispersion stabilizer, wherein the crude oil has an API specific gravity of 30° or less, and
the crude oil dispersion stabilizer comprises a vinyl alcohol-based polymer, wherein a degree of saponification of the vinyl alcohol-based polymer is greater than 70 mol % and 82 mol % or less, and a total content of carboxyl groups and lactone rings is 0.02 to 1 mol % relative to all structural units of the vinyl alcohol-based polymer.

4. The method according to claim 3, wherein a viscosity-average degree of polymerization of the vinyl alcohol-based polymer is 100 to 4000.

* * * * *